United States Patent Office 3,260,569
Patented July 12, 1966

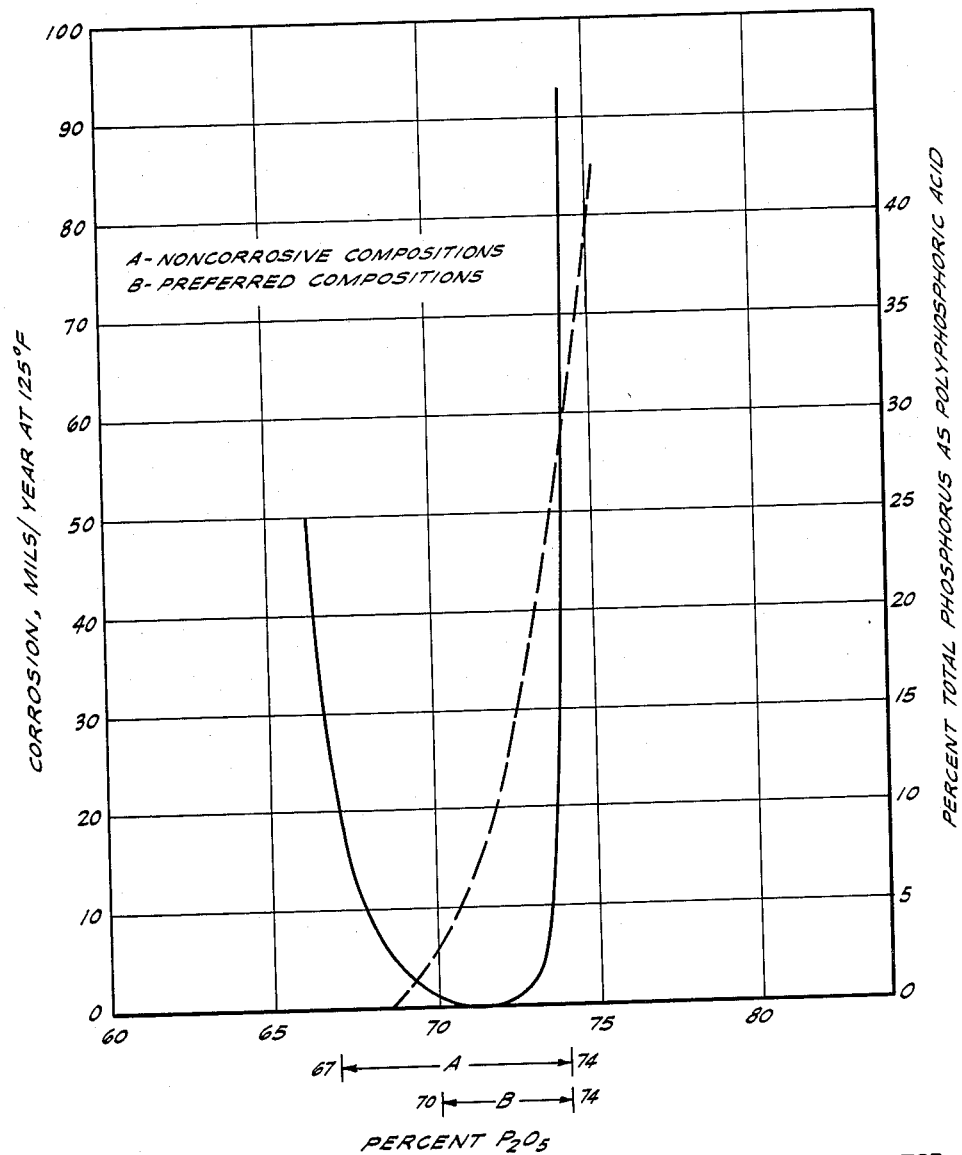

3,260,569
PHOSPHORIC ACID COMPOSITIONS
Donald C. Young, Fullerton, Calif., assignor to Union Oil Company of California, Los Angeles, Calif., a corporation of California
Filed Feb. 25, 1963, Ser. No. 260,736
12 Claims. (Cl. 23—165)

This application is a continuation-in-part of my copending application, Serial Number 854,592, now abandoned.

This invention relates to phosphoric acid and in particular relates to a highly concentrated phosphoric acid composition having a low corrosivity and low viscosity. Such compostions are useful in many varied applications such as gas drying, metal pickling, fertilizer manufacture, etc.

"Wet-process" phosphoric acid of commerce is manufactured by a process which consists of treating phosphate rock (essentially calcium phosphate) with sulfuric acid, whereby there is formed free phosphoric acid and calcium sulfate. The latter, being insoluble, is separated from the acid by filtration. While this process is simple in concept, it is fraught with many technical difficulties and complications, and the resultant phosphoric acid product is an impure material, dark in color and containing relatively large amounts of dissolved sulfates, fluorides, fluorosilicates and other salts of aluminum, magnesium, iron and other metals, as well as suspended organic matter.

The wet-process phosphoric acid of commerce is generally produced and handled at concentrations of about 25 and 52 weight percent $P_2O_5$. The acid at this concentration is highly corrosive to mild steel at ambient temperatures and corrosive to most materials of construction, including stainless steels at elevated temperatures. As a result, the acid is usually shipped in rubber or polyethylene lined containers and stored in lead, brick or rubber lined vessels. Shipment and handling of the wet-process acid at the aforementioned concentrations is practiced despite the knowledge of the art that at concentrations between about 67 and about 74 weight percent $P_2O_5$, the acid is non-corrosive to mild steel and ferrous metals.

When wet-process phosphoric acid is concentrated above the normal levels commonly handled, most of its free water is removed and the metal orthophosphate impurities present in the acid become unstable and precipitate from the acid. In my copending application, Serial No. 51,047, now Patent 3,192,013, I have disclosed that this precipitation can be avoided by concentrating the acid to remove most or all its free water and thereafter molecularly dehydrating the orthophosphoric acid to polyphosphoric acids by continued concentration. The polyphosphoric acids so formed chelate the metal impurities and prevent their precipitation.

The amount and nature of impurities present in the acid determines the amount of polyphosphoric acid necessary for their chelation. In general, polyphosphoric acids are present in amounts comprising between about 0 and about 30 percent of the phosphorus in the acid throughout the aforementioned non-corrosive concentration range (67–74 weight percent $P_2O_5$). In some phosphoric acids having a low content of impurities, all the impurities can be chelated without exceeding the maximum concentration limit for a non-corrosive acid and the addition of an organic chelating agent would not be necessary.

Frequently, however, the metal impurities are present in the acid in large amounts and to secure their chelation by the polyphosphoric acid alone, the concentration of the acid must exceed the maximum non-corrosive limit, about 74 weight percent $P_2O_5$ so that the resultant acid is highly corrosive. While this product can be handled as a liquid, its highly corrosive nature requires the use of rubber or plastic lined vessels and tanks.

It is an objective of this invention to provide a highly concentrated wet process phosphoric acid which is a stable liquid.

It is also an object of this invention to provide said acid in a non-corrosive concentration.

I have now found that a highly concentrated phosphoric acid can be obtained from wet-process phosphoric acid which contains the metallic impurities incident thereto in a stable chelate form yet which is substantially non-corrosive to mild steel and ferrous metals.

My invention comprises a stable and non-corrosive liquid phosphoric acid having an impurity and additive free concentration expressed as $P_2O_5$ between about 67 and about 74 weight percent, between about 1 and about 10 weight percent metal impurities and between about 0.01 and 5 weight percent of an organic sequestering agent which is stable in said acid and which forms water soluble chelates with said metallic ions.

In its preferred embodiment, my invention comprises a concentrated phosphoric acid having the aforementioned metallic impurities and organic sequestering agent with a concentration between about 72 and about 74 weight percent $P_2O_5$ on an impurity and additive free basis. At the latter concentration, there is present in the phosphoric acid a sufficient amount of polyphosphoric acid to achieve the bulk of the necessary chelation of the metallic impurities. The amount of unchelated metallic impurities, i.e., that amount in excess of the chelation sites in the polyphosphoric acid, are chelated by the organic chelating agent. I have found that this organic chelating agent retains these impurities in solution and, most importantly, prevents their precipitation without imparting a corrosive nature to the acid.

The figure illustrates the highly corrosive nature of phosphoric acid at most concentrations and shows the non-corrosive region of compositions employed in my invention. The non-corrosive range of acid concentration with which my invention is employed is indicated by legend A to be from about 67 to about 74 weight percent $P_2O_5$ and, preferably is from about 70 to about 74 weight percent; legend B.

The broken line in the figure represents the concentration of the polyphosphoric acids (chiefly pyrophosphoric) as a percent of the total phosphorus in the acid. Traces of the polyphosphoric acid are formed at about 68 weight percent $P_2O_5$ and the amount of this molecularly dehydrated acid increases rapidly with further bulk concentration of the acid. At about 72 weight percent $P_2O_5$ strength, the amount of phosphorus in polymeric form is about 11 percent and the acid acquires a detectible corrosivity. Further dehydration of the acid results in a rapid increase in polymeric acid and an increase in corrosion rate, until at about 74 weight percent $P_2O_5$ strength, the acid is too corrosive for handling in mild steel.

The high corrosivity of acids having greater than about 74 weight percent $P_2O_5$ strength thus limits their use and handling in mild steel. The maximum amount of polymeric phosphorus at this limiting strength is about 25 weight percent of the total. This maximum concentration of polyphosphoric acid is sufficient to chelate the following amounts of impurities (expressed as oxides): 1 percent magnesium, 6 percent copper, 8 percent aluminum or about 10 percent iron. Generally, various mixtures of these impurities as well as others such as chromium, vanadium, zinc, etc. are present in wet-process acid of commerce and the necessary amount of polyphosphoric acid for their chelation varies considerably. Generally, however, acids having in excess of about 3 weight percent metal oxides at their conventional strength of 52 weight percent $P_2O_5$ can not be concentrated to a stable anhydrous acid unless their concentration exceeds the non-corrosive upper limit of 74 weight percent $P_2O_5$. It is in regard to these acids that my invention is most applicable since I have discovered that such acids can be concentrated to the maximum non-corrosive limit of $P_2O_5$, about 70 to 74 weight percent $P_2O_5$ and thereby chelate the majority of the metal impurities and the excess or unchelated metal impurities which remain are chelated by the extraneous organic chelating agent added in an amount from about 0.1 to 5; preferably from about 0.1 to 2 weight percent. The polyphosphoric acid content of such acids is between about 2 and about 30 weight percent of the total phosphorus. It is of course apparent that the most preferred acids would have the maximum permissible $P_2O_5$ contents within the limits of normal commercial control. Such most preferred compositions would contain about 73 to 74 weight percent $P_2O_5$ and have from about 18 to about 30 weight percent of the phosphorus as polyphosphoric acids, the remainder as orthophosphoric acid. The metal impurities, present in excess of the amount chelated by said polyphosphoric acids, comprise from about 3 to about 10 weight percent (as oxides) and the excess or unchelated metal cations are chelated by the organic chelating agent which is present, preferably in amounts between about 0.1 and 2.0 weight percent.

Surprisingly, the addition of an organic chelating agent to the non-corrosive anhydrous phosphoric acids of my invention does not impart corrosivity to the acid. This is in marked contrast to the very corrosive nature imparted when the content of polyphosphoric acid in the anhydrous acid is increased.

As has been previously described, the phosphoric acids having concentrations between about 67 and 74 weight percent $P_2O_5$ are essentially free of uncombined water. Consequently, it is believed that the minimum corrosivity observed for these acids is caused by the insolubility of iron in the anhydrous orthophosphoric acid which forms a film of ferrous orthophosphate on the metal surface. It is believed that the acid is corrosive at higher concentrations since the polyphosphoric acid present at these concentrations chelates ferric ions and thereby destroys the ferric orthophosphate film. In view of this, it was quite unexpected to find that organic chelating agents when added to the phosphoric acid, did not similarly impart a corrosive nature to the acid. Nevertheless, I found that the non-corrosive nature of the anhydrous acid was retained even though large amounts of organic chelating agents were added. It is therefore believed that the corrosivity imparted to the anhydrous acid by the polyphosphoric acid is probably caused by the chemical similarity between the latter and the protective orthophosphate film. This similarity undoubtedly imparts a high affinity of the chelating agent and the protective iron orthophosphate film, permitting its removal by chelation of the ferric ions.

The addition of an organic chelating agent to anhydrous phosphoric acid often exhibits a surprising depression of the acid's viscosity. It is believed that this effect is caused by the chelation of excess metallic impurities in the acid, i.e., those impurities present in an amount in excess of the chelation sites of the polyphosphoric acid in the acid. Anhydrous wet-process phosphoric acids which are insufficiently concentrated to have formed the necessary amount of polyphosphoric acids to completely chelate the normally incidental impurities, e.g., iron and aluminum, contain micro-crystalline precipitates of the latter. These precipitates, it is believed, cause an abnormally high visvosity and will, ultimately, salt out. In accordance with my invention, however, the viscosity of the acid is reduced and the formation of precipitates is avoided by the addition of slight amounts, 0.01 and 5 weight percent of an organic chelating agent.

Chelation of multivalent metallic ions into water soluble complexes comprises a well established field of modern chemistry. In formative sources on this subject are: Organic Sequestering Agents by Chaberek and Martell (1959) and The Sequestration of Metals by P. L. Smith (1959). Briefly, however, chelating agents have two or more atoms, commonly referred to as dentate centers, in the molecule which are capable of forming an ionic or a coordinate covalent bond with multivalent metal ions. The compounds are commonly called bidentate or polydentate compounds in reference to the number of dentate groups per molecule. The most common agents have oxygen and/or nitrogen atoms as such centers which are spaced in the molecule to form a 5, 6 or 7 member ring when the multivalent metal ion is bridged across the centers. Such organic compounds thus have at least two denate centers, i.e., nitrogen or oxygen atoms which are separated by 1 to about 3 carbon atoms. Typical substituents in organic molecules which furnish the oxygen and/or nitrogen centers are aldehyde groups, nitro groups, amide groups, carboxyl groups, ester groups, ketone groups, nitroso groups, hydroxyls, etc.

As examples of chelating agents suitable for use in accordance with my invention because such organic compounds are stable in concentrated phosphoric acid and form water soluble chelates with multivalent metal ions are:

Hydroxymonobasic, hydroxydibasic and dibasic aliphatic acids such as glycolic acid, lactic acid, betahydroxy butyric acid, alphahydroxy butyric acid, glyceric acid, gluconic acid, maleic acid, tartaric acid, citric acid, etc.;

Carboxylic acid esters of glycol such as glycol monolaurate, glycol monostearate, glycol mono(p-tertiary) amyl benzoate, glycol monoacetate, glycol monopropionate, glycol monobutyrate, etc.;

Alkylenediamines, N-alkylalkylenediamines, N,N'-alkylalkylenediamines and alkylenediaminecarboxylic acids and their salts can also be used, particularly ethylenediamine, its carboxylic acids and salts thereof. Examples of such compounds are:

ethylenediamine,
N-methylethylenediamine,
N-ethylethylenediamine,
N-n-propylenediamine,
N-isopropylethylenediamine,
N-n-butylethylenediamine,
N-N-dimethylethylenediamine,
N,N-diethylethylenediamine,
N,N'-dimethylethylenediamine,
N,N'-diethylethylenediamine,
N,N'-di-n-propylethylenediamine,
propylenediamine,
2,2-dimethyl-1,2-diaminoethane,
2,3-dimethyl-2,3-diaminobutane,
trimethylenediamine,
2,2-dimethyl-1,3-diaminopropane,
2-hydroxy-1,3-diaminopropane,
tetramethylenediamine,
pentamethylenediamine,
ethylenediamine-N,N'-dipropionic acid,
N-butylethylenediaminetriacetic acid,
N-cyclohexylethylene-diaminetriacetic acid,
N-hydroxyethylethylenediaminetriacetic acid,
ethylenediaminetetraacetic acid,
trimethylenediaminetetraacetic acid,
tetramethylenediaminetetraacetic acid,
pentamethylenediaminetetraacetic acid,
1,2-diaminocyclohexane-N,N'-tetraacetic acid,
ethylenediamine-N,N'-dipropionic-N,N'-diacetic acid,
ethylenediamine-N,N'-tetrapropionic acid,
N-hydroxyethyl-N,N',N''-diethylenetriaminetetraacetic acid,
diethylenetriaminepentaacetic acid, etc.;

Aliphatic hydroxy ketones and hydroxy aldehydes can also be used such as 2-hydroxy-5-acetyl acetophenone, 2-hydroxy-4-butyl benzaldehyde, etc.

The following compositions will serve to illustrate the practice of my invention:

Wet-process phosphoric acids, containing between about 1 and 10 weight percent metallic impurities, calculated as oxides, are concentrated to a substantially anhydrous condition having the concentrations set forth in the following tables. The impurities content are also set forth together with the identity and amount of organic chelating agent which will retain a low viscosity and prevent the formation of insoluble precipitates in the acid.

*Sample 1*

| | Weight percent |
|---|---|
| $P_2O_5$ | 66.5 |
| $H_2O$ | 28.5 |
| Impurities | 5.0 |
| Iron | 0.5 |
| Aluminum | 1.5 |
| Magnesium | 0.3 |
| Other metal and sulfate | 2.7 |
| Citric acid | 0.5 |

*Sample 2*

| | |
|---|---|
| $P_2O_5$ | 67.3 |
| $H_2O$ | 27.7 |
| Impurities | 5.0 |
| Iron | 0.6 |
| Aluminum | 1.7 |
| Magnesium | 0.3 |
| Other metal and sulfate | 2.4 |
| Glycolic acid | 0.7 |

*Sample 3*

| | |
|---|---|
| $P_2O_5$ | 67.6 |
| $H_2O$ | 27.4 |
| Impurities | 5.0 |
| Iron | 0.6 |
| Aluminum | 1.6 |
| Magnesium | 0.2 |
| Other metal and sulfate | 2.6 |
| Butyric acid | 1.1 |

*Sample 4*

| | |
|---|---|
| $P_2O_5$ | 68.2 |
| $H_2O$ | 25.8 |
| Impurities | 6.0 |
| Iron | 0.5 |
| Aluminum | 1.7 |
| Magnesium | 0.4 |
| Other metal and sulfate | 3.4 |
| Maleic acid | 0.6 |

*Sample 5*

| | |
|---|---|
| $P_2O_5$ | 68.8 |
| $H_2O$ | 24.2 |
| Impurities | 7.0 |
| Iron | 0.6 |
| Aluminum | 2.5 |
| Magnesium | 0.3 |
| Other metal and sulfate | 4.6 |
| Glycol monostearate | 1.3 |

*Sample 6*

| | |
|---|---|
| $P_2O_5$ | 69.5 |
| $H_2O$ | 22.5 |
| Impurities | 8.0 |
| Iron | 1.3 |
| Aluminum | 3.4 |
| Magnesium | 0.3 |
| Other metal and sulfate | 3.0 |
| Glycol monoacetate | 2.7 |

*Sample 7*

| | Weight percent |
|---|---|
| $P_2O_5$ | 70.0 |
| $H_2O$ | 21.0 |
| Impurities | 9.0 |
| Iron | 1.5 |
| Aluminum | 3.7 |
| Magnesium | 0.4 |
| Other metal and sulfate | 3.4 |
| N-isopropylethylenediamine | 1.5 |

*Sample 8*

| | |
|---|---|
| $P_2O_5$ | 66.5 |
| $H_2O$ | 28.5 |
| Impurities | 5.0 |
| Iron | 0.4 |
| Aluminum | 1.6 |
| Magnesium | 0.3 |
| Other metal and sulfate | 2.7 |
| 2,2 dimethyl-1,3-diaminopropane | 1.0 |

*Sample 9*

| | |
|---|---|
| $P_2O_5$ | 67.3 |
| $H_2O$ | 27.7 |
| Impurities | 5.0 |
| Iron | 0.6 |
| Aluminum | 1.7 |
| Magnesium | 0.3 |
| Other metal sulfate | 2.4 |
| Ethylenediamine-N,N'-propionic acid | 1.2 |

*Sample 10*

| | |
|---|---|
| $P_2O_5$ | 67.6 |
| $H_2O$ | 27.4 |
| Impurities | 5.0 |
| Iron | 0.6 |
| Aluminum | 1.6 |
| Magnesium | 0.2 |
| Other metal and sulfate | 2.6 |
| N-hydroxyethylethylenediaminetriacetic acid | 1.7 |

*Sample 11*

| | |
|---|---|
| $P_2O_5$ | 68.2 |
| $H_2O$ | 25.8 |
| Impurities | 6.0 |
| Iron | 0.5 |
| Aluminum | 1.7 |
| Magnesium | 0.4 |
| Other metal and sulfate | 3.4 |
| Ethylenediaminetetraacetic acid | 1.2 |

*Sample 12*

| | |
|---|---|
| $P_2O_5$ | 68.8 |
| $H_2O$ | 24.2 |
| Impurities | 7.0 |
| Iron | 0.6 |
| Aluminum | 2.5 |
| Magnesium | 0.3 |
| Other metal and sulfate | 4.6 |
| N-butylethylenediaminetriacetic acid | 1.2 |

*Sample 13*

| | |
|---|---|
| $P_2O_5$ | 69.5 |
| $H_2O$ | 22.5 |
| Impurities | 8.0 |
| Iron | 1.3 |
| Aluminum | 3.4 |
| Magnesium | 0.3 |
| Other metal sulfate | 3.0 |
| Trimethylenediaminetetraacetic acid | 2.3 |

Sample 14

| | Weight percent |
|---|---|
| $P_2O_5$ | 70.0 |
| $H_2O$ | 21.0 |
| Impurities | 9.0 |
| Iron | 1.5 |
| Aluminum | 3.7 |
| Magnesium | 0.4 |
| Other metal and sulfate | 3.4 |
| 1,2-diaminocyclohexane-N,N'-tetraacetic acid | 2.0 |

Sample 15

| | |
|---|---|
| $P_2O_5$ | 66.5 |
| $H_2O$ | 28.5 |
| Impurities | 5.0 |
| Iron | 0.4 |
| Aluminum | 1.6 |
| Magnesium | 0.3 |
| Other metal and sulfate | 2.7 |
| N - hydroxyethyl - N,N',N'',N''-diethylenetriaminetetraacetic acid | 1.0 |

Sample 16

| | |
|---|---|
| $P_2O_5$ | 67.3 |
| $H_2O$ | 27.7 |
| Impurities | 5.0 |
| Iron | 0.6 |
| Aluminum | 1.7 |
| Magnesium | 0.3 |
| Other metal and sulfate | 2.4 |
| 2-hydroxy-5-acetyl acetophenone | 1.3 |

EXAMPLE 1

To determine the depressing effect on viscosity exhibited by organic chelating agents, the sodium salt of ethylenediaminetetraacetic acid (EDTA), was added to concentrated wet-process phosphoric acid containing about 5 weight percent impurities and 69 weight percent $P_2O_5$, and having a viscosity of 2,000 centipoises at 80° F. and a negligible corrosion rate. Three compositions were prepared, containing the chelating agent in concentrations of 0.01, 0.1 and 1.0 weight percent, respectively. The effect of the chelating agent was to reduce the acid's viscosity without any noticeable effect on the acid's corrosivity. The test data are presented in the following table:

| Sample Description | Additive (weight percent) | Viscosity (cp. at 80° F.) | Corrosion Rate (mils per year at 125° F.) |
|---|---|---|---|
| Acid | None | 2,000 | Negligible. |
| Acid and EDTA | 0.1 EDTA | 1,770 | Do. |
| Acid and EDTA | 1.0 EDTA | 1,590 | Do. |

The acid sample prior to addition of EDTA was observed to contain microcrystalline solids which disappeared upon addition of the EDTA.

In accordance with invention described and claimed in the co-pending application of Bergsteinsson et al., Serial No. 850,017, now U.S. Patent No. 3,077,381, ammonia or an ammonium salt may be added to the present compositions for the purpose of depressing the freezing point of the acid to enable it to be handled as a liquid at ambient temperatures. The ammonia or ammonium salt is added in an amount sufficient to effect a substantial reduction in the freezing point of the compositions, usually in an amount representing between about 0.5 and about 3.0 percent by weight of the entire compositions. Ammonia is preferred, but any ammonium salt, e.g., ammonium sulfate, ammonium chloride, diammonium phosphate, ammonium nitrate, ammonium lactate, ammonium citrate, ammonium carbonate, etc., may be employed if desired. The ammonia or ammonium salt may be added to the acid either before or after the addition of the chelating agent.

EXAMPLE 2

The sodium salt of EDTA in a concentration of 0.1 weight percent was added to a sample of the phosphoric acid described in Example 1 to which had been added 0.55 weight percent of ammonia. The EDTA substantially reduced the viscosity of the composition acid as shown in the following table:

| Sample Description | Additive weight percent) | Freezing Point (° F.) | Viscosity (cp. at 80° F.) | Corrosion Rate (mils per year at 125° F.) |
|---|---|---|---|---|
| Acid | None | >70 | 2,000 | Negligible. |
| Acid and $NH_3$ | 0.55 $NH_3$ | <50 | 2,600 | Do. |
| Acid and $NH_3$ plus EDTA | 0.55 $NH_3$ plus 0.1 EDTA | <50 | 1,700 | Do. |

Microscopic solids again disappeared from the acid upon addition of the EDTA.

EXAMPLE 3

The sodium salt of EDTA was added at the same concentrations employed in Example 2 to phosphoric acid containing 1.8 weight percent of ammonia. The 0.1 of EDTA again substantially reduced the viscosity of the mixture as shown in the following table:

| Sample Description | Additive (weight percent) | Freezing Point (° F.) | Viscosity (cp. at 80° F.) | Corrosion Rate (mils per year at 125° F.) |
|---|---|---|---|---|
| Acid | None | >70 | 2,000 | Negligible. |
| Acid and $NH_3$ | 1.8 $NH_3$ | <40 | 5,610 | Do. |
| Acid and $NH_3$ plus EDTA | 1.8 $NH_3$ plus 0.1 EDTA | <40 | 4,560 | Do. |

EXAMPLE 4

The sodium salt of EDTA was added at the same concentration employed in Example 2 to phosphoric acid containing 2.7 weight percent ammonia. The additive was effective in depressing the viscosity of the mixture as shown in the following table:

| Sample Description | Additive (weight percent) | Freezing Point (° F.) | Viscosity (cp. at 80° F.) | Corrosion Rate (mils per year at 125° F.) |
|---|---|---|---|---|
| Acid | None | >70 | 2,000 | Negligible. |
| Acid and $NH_3$ | 2.7 $NH_3$ | <40 | 10,660 | Do. |
| Acid and $NH_3$ plus EDTA | 2.7 $NH_3$ plus 0.1 EDTA | <40 | 8,100 | Do. |

EXAMPLE 5

Another chelating agent, 0.1 weight percent of citric acid, was added to a mixture of phosphoric acid and 0.55 weight percent of ammonia. The citric acid was effective in reducing the viscosity of the mixture from 2,600 centipoises to 2,300 centipoises. The acid remained non-corrosive after addition of the citric acid. Larger amounts of citric acid effect a further reduction in the viscosity of the acid.

The preceding examples are intended only for illustration of the invention and are not to be considered as limiting the invention which comprises the addition of an organic chelating agent to phosphoric acid and compositions thereof in an amount sufficient to stabilize the acid against the precipitation of metal impurities contained therein. My invention is defined by the components and equivalents set forth in the following claims.

I claim:

1. A phosphoric acid composition comprising wet-process phosphoric acid containing between about 67 and about 74 weight percent $P_2O_5$ on an impurity and additive-free basis and containing between about 1 and 25 weight percent of said $P_2O_5$ content as polyphosphoric acid, from 1 to about 10 weight percent of metallic cations comprising those impurities normally incident in said wet-process phosphoric acid said impurities being present in an amount in excess of the chelation capacity of said polyphosphoric acid and between about 0.01 and about 2.0 percent by weight of said composition of a water soluble organic chelating agent having at least 2 dentate centers which form a chemical bond with said metallic cations, each of said dentate centers comprising an atom selected from the class consisting of nitrogen and oxygen atoms, said dentate centers being separated in said agent by 1 to 3 carbon atoms to thereby impart to said agent the capacity to form a complex with said metallic cations.

2. The composition of claim 1 wherein said impurities comprise iron, aluminum and magnesium.

3. The composition of claim 1 wherein said organic chelating agent is citric acid.

4. The composition of claim 1 wherein said organic chelating agent is sodium ethylenediamine tetraacetate.

5. The acid of claim 1 wherein said organic chelating agent is selected from the class consisting of alkylene diamines, alkylene diamine carboxylic acids, alkylene diamine carboxylates, N-alkylalkylenediamines, and N,N'-alkylalkylenediamines.

6. The acid of claim 5 wherein said organic chelating agent is ethylenediaminetetraacetic acid.

7. A stable and non-corrosive anhydrous phosphoric acid derived from wet-process phosphoric acid containing incidental metallic impurities, said acid having:
  a concentration of $P_2O_5$ on an impurity free basis between about 70 and about 74 weight percent;
  between about 3 and about 10 weight percent of said metallic impurities;
  between about 2.0 and about 30 weight percent of said $P_2O_5$ being present as acyclic polyphosphoric acid and the remainder thereof as orthophosphoric acid; the amount of said acyclic polyphosphoric acid being insufficient to chelate all said metal impurities; and
  the balance of said metal impurities remaining unchelated by said polyphosphoric acid beeing chelated by an organic chelating agent which is present in an amount between about 0.1 and about 2.0 weight percent and which is stable in said phosphoric acid and forms water soluble chelates with metal cations.

8. The acid of claim 7 wherein said organic chelating agent is selected from the class consisting of alkylene diamines, alkylene diamine carboxylic acids, alkylene diamine carboxylates, N-alkylalkylenediamines, and N,N'-alkylalkylenediamines.

9. The acid of claim 8 wherein said organic chelating agent is ethylenediaminetetraacetic acid.

10. The acid of claim 7 wherein said organic chelating agent is citric acid.

11. The acid composition of claim 1 wherein said organic chelating agent is a water soluble hydroxy aliphatic acid and wherein said dentate centers comprise the hydroxy and the carboxylic acid group of said acid which are separated in said acid by 1 to 3 carbon atoms.

12. The acid composition of claim 7 that also contains from 0.5 to 3.0 weight percent of ammonium containing compound.

References Cited by the Examiner

UNITED STATES PATENTS

| | | | |
|---|---|---|---|
| 2,710,792 | 6/1955 | McDonald et al. | 252—70.4 X |
| 2,955,919 | 10/1960 | Wilson | 23—165 |
| 3,057,711 | 10/1962 | Reusser et al. | 71—43 |
| 3,076,701 | 2/1963 | Bersworth et al. | 71—43 |
| 3,077,381 | 2/1963 | Bergsteinsson et al. | 252—136 X |
| 3,118,730 | 1/1964 | Nickerson | 23—165 |

OTHER REFERENCES

Versenes—Tech Bulletin #2 Section I, pages 1–9; Section II, pages 46–51, Bersworth Chemical Co. (1952).

OSCAR R. VERTIZ, *Primary Examiner.*

JULIUS GREENWALD, BENJAMIN HENKIN,
*Examiners.*

W. E. SCHULZ, O. F. CRUTCHFIELD,
*Assistant Examiners.*